(12) United States Patent
Charuel et al.

(10) Patent No.: US 8,403,259 B2
(45) Date of Patent: Mar. 26, 2013

(54) METHOD OF TAXIING AN AIRCRAFT

(75) Inventors: Hervé Charuel, Nozay (FR); David Delloue, Le Plessis-Robinson (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 58 days.

(21) Appl. No.: 12/767,451

(22) Filed: Apr. 26, 2010

(65) Prior Publication Data

US 2010/0276535 A1   Nov. 4, 2010

(30) Foreign Application Priority Data

Apr. 24, 2009   (FR) ...................................... 09 02001

(51) Int. Cl.
 *B64C 25/32* (2006.01)
(52) U.S. Cl. .......................... 244/103 S; 244/50; 244/51
(58) Field of Classification Search ............... 244/103 S, 244/50, 51
See application file for complete search history.

(56) References Cited

U.S. PATENT DOCUMENTS

| | | | | |
|---|---|---|---|---|
| 7,469,858 B2 * | 12/2008 | Edelson | ...................... | 244/103 S |
| 7,891,609 B2 * | 2/2011 | Cox et al. | ...................... | 244/121 |
| 2006/0038068 A1 * | 2/2006 | Sullivan | ...................... | 244/111 |
| 2006/0065779 A1 | 3/2006 | McCoskey et al. | | |
| 2009/0114765 A1 * | 5/2009 | Cox et al. | ......................... | 244/50 |
| 2009/0218440 A1 * | 9/2009 | Dilmaghani et al. | ........... | 244/50 |

* cited by examiner

*Primary Examiner* — J. Woodow Eldred
(74) *Attorney, Agent, or Firm* — Sughrue Mion, PLLC

(57) ABSTRACT

The invention provides a method of taxiing an aircraft having at least one nose undercarriage at the front of the aircraft and main undercarriages, each undercarriage having wheels, the method comprising the steps of:
 fitting at least one of the wheels carried by the nose undercarriage with a main taxiing motor member, and fitting at least one of the wheels carried by the main undercarriages with an auxiliary taxiing motor member; and
 in response to a taxiing order, powering the main taxiing motor member to cause the aircraft to taxi, and in particular if the driving force developed by the main taxiing motor member on the aircraft is insufficient, powering the auxiliary taxiing motor member, as required.

7 Claims, 4 Drawing Sheets

METHOD OF TAXIING AN AIRCRAFT

The invention relates to a method of taxiing an aircraft.

TECHNOLOGICAL BACKGROUND OF THE INVENTION

Proposals have been made to place taxiing motors in the wheels of the main landing gear of an aircraft in order to enable the aircraft to be maneuvered and taxied on the ground without requiring thrust from its engines. For this purpose, the motors are powered by means of an electricity generator driven by the auxiliary power unit of the aircraft.

Main landing gear wheels are generally heavily loaded and they have the potential of developing a high level of driving force. Nevertheless, main landing gear wheels are generally fitted with brakes, and as result there remains very little space available for receiving a motor of significant power. Various arrangements have been proposed for mitigating such lack of space.

For example, document US 2006/055779 proposes placing the taxiing motors in the nosegear wheels, which generally do not include brakes. A large volume is thus available for receiving motors of significant power. Furthermore, the generally smaller, rolling radius of the tires of nosegear wheels makes it easier to develop a driving force of greater magnitude for equivalent torque. Nevertheless, the nose landing gear is much more lightly loaded than is the main landing gear. Commonly it supports 10% to 15% of the weight of the aircraft, which percentage may drop to as little as 5% in certain tail-heavy situations. The driving force that can be developed by the nosegear wheels may then be insufficient for moving the aircraft, particularly if the taxiway is sloping, wet, or even icy.

OBJECT OF THE INVENTION

An object of the invention is to propose an arrangement of taxiing motors and a method of managing said motors that enable the aircraft to taxi.

BRIEF SUMMARY OF THE INVENTION

To achieve this object, the invention proposes a method of taxiing an aircraft having at least one nose undercarriage at the front of the aircraft and main undercarriages, each undercarriage having wheels, the method comprising the steps of:

fitting at least one of the wheels carried by the nose undercarriage with a main taxiing motor member, and fitting at least one of the wheels carried by the main undercarriages with an auxiliary taxiing motor member; and in response to a taxiing order, powering the main taxiing motor member to cause the aircraft to taxi, and at least in a situation where the driving force developed by the main taxiing motor member on the aircraft is not sufficient to move the aircraft, powering the auxiliary taxiing motor member in addition to the main taxiing motor member.

Thus, advantage is taken of the large volume inside the nose undercarriage wheels to receive a main taxiing motor member that is generally sufficient for causing the aircraft to taxi, except perhaps when starting the aircraft, or when taxiing the aircraft on a taxiway that is sloping or that presents low coefficient of friction. Under such circumstances, the auxiliary taxiing motor member housed in a wheel carried by the main undercarriages is used for as long as necessary, and once it is no longer necessary for causing the aircraft to taxi, it ceases to be used. Where appropriate, it may be appropriate to continue powering the auxiliary taxiing motor member so as to avoid it opposing forward movement of the aircraft.

The auxiliary taxiing motor member is normally of limited power, thereby making it easier for it to be received in a main landing gear wheel.

In a preferred arrangement, all of the auxiliary undercarriage wheels are fitted with respective main taxiing motor members. Full advantage is then taken of the total volume available for receiving the power needed for most taxiing operations of the aircraft.

In a particular arrangement, all of the wheels of the main undercarriages are fitted with respective auxiliary taxiing motor members. Thus, all of the main undercarriage wheels are identical, thereby avoiding any need to manage a plurality of references. In addition, the auxiliary power is thus distributed so that the auxiliary motor members are in practice more compact and thus more easily housed in the main undercarriage wheels.

The terms "main" and "auxiliary" when used with respect to the taxiing motor, members serve to reflect the priority with which these motors are used, and do not in any way prejudice the relative power or dimensions of these motor members.

According to an advantageous aspect, the power delivered to the taxiing motor members is continuously adapted so that the taxiing of the aircraft complies with the taxiing order, with the torque delivered by the auxiliary taxiing motor member being reduced to zero as soon as it is no longer useful for causing the aircraft to taxi. Thus, once the aircraft has begun to move, resistance to movement drops significantly, and it is often pointless to continue powering the auxiliary taxiing motor member(s), other than to provide them with sufficient power to ensure that they do not generate any resistive torque opposing movement of the aircraft.

BRIEF DESCRIPTION OF THE FIGURES

The invention can be better understood in the light of the following description of implementations of the invention, given with reference to the figures of the accompanying drawings, in which:

With reference to FIG. 1, the aircraft comprises nose landing gear 1 carrying two wheels 2 that are fitted with respective main taxiing motors 3.

FIG. 2 shows one of the wheels 2 of the nose landing gear 1 with its hollow rim 4 defining an internal volume suitable for receiving a main taxiing motor 3 of substantial size. In this example, the main taxiing motor comprises a wound stator 3a secured to the landing gear and in electromagnetic relationship with a permanent magnet rotor 3b secured to the rim of the wheel 2. In this example the taxiing motor comprises a single electric motor of the torque motor type, preferably without any gearing.

The aircraft also includes two main undercarriages 5, each carrying two wheels 6, each of which wheels is fitted with an auxiliary taxiing motor 7.

Figure 1:
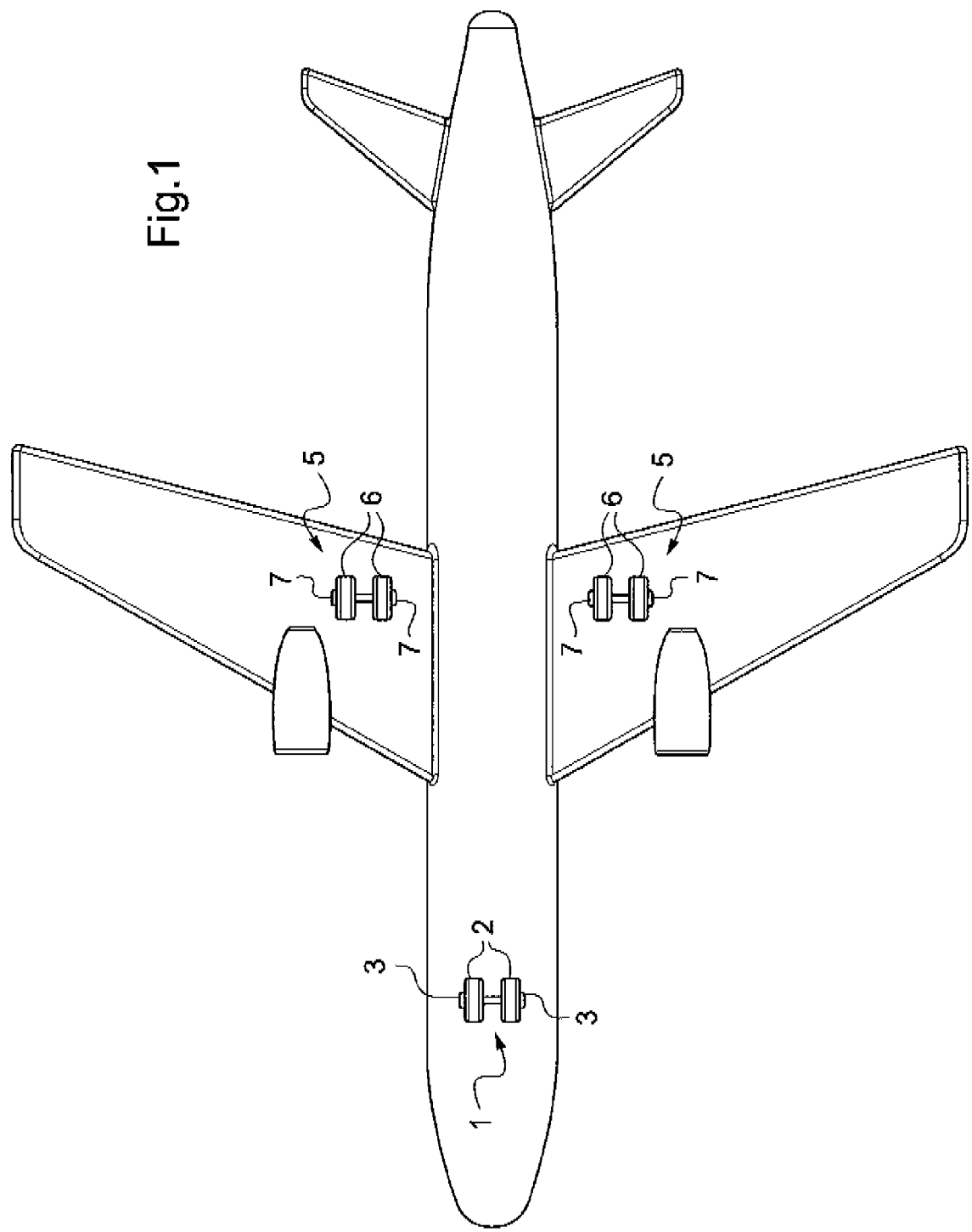
FIG. 1 is a diagrammatic view of an aircraft fitted with main and auxiliary taxiing motors in a first implementation of the invention.
Figure 2:
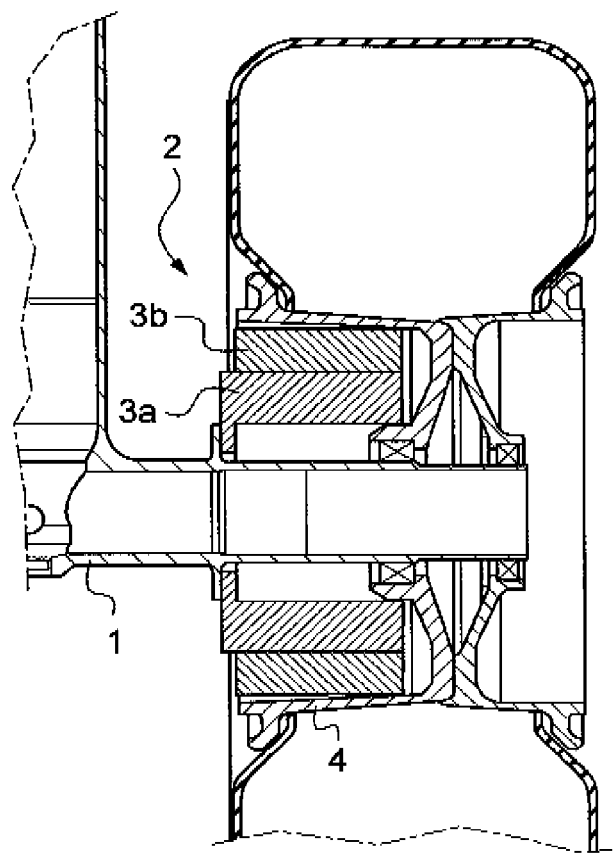
FIG. 2 is a fragmentary section view of a nosewheel fitted with a main taxiing motor.
Figure 3:
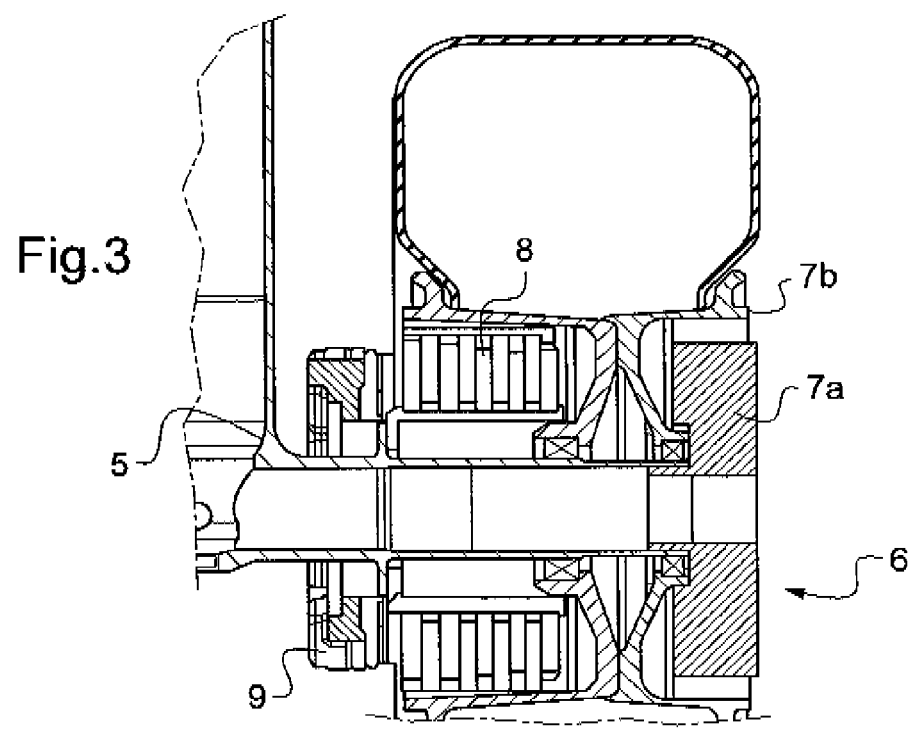
FIG. 3 is a fragmentary section of a main landing gear wheel fitted with an auxiliary taxiing motor.
Figure 4:
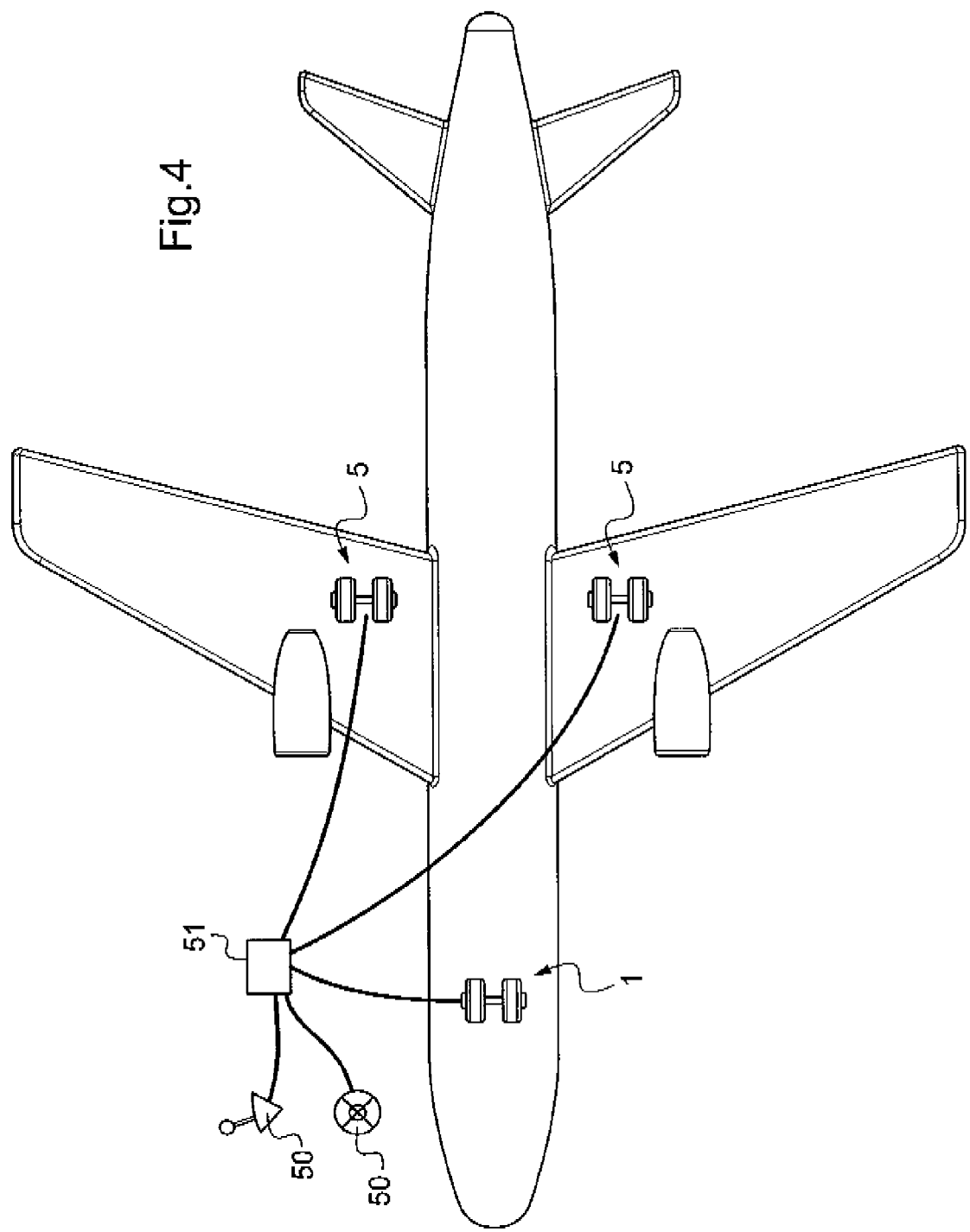
FIG. 4 is a diagrammatic view of an aircraft fitted with main and auxiliary taxiing motors in a second implementation of the invention.

FIG. 3 shows one of the wheels 6 of a main undercarriage 5 having a rim that is hollow. In this example the internal volume of the rim is occupied essentially by a brake and there can be seen the stack of disks 8 and the ring 9 carrying the brake pistons. In this example, the auxiliary taxiing motor 7 is in the form of a disk motor comprising a wound stator 7a secured to the end of the axle and in electromagnetic relationship with a permanent magnet rotor disk 7b secured to the wheel 6. The auxiliary taxiing motor is located towards the outside of the wheel, on its side opposite from the brake.

Naturally, the invention is not limited to this type of motor, and it is possible to use other types of motor, be they electric, hydraulic, or based on any other technology.

The method of the invention is as follows. With the aircraft stationary, the pilot operates the aircraft taxiing control. This control may be a control that is separate from the throttle control lever, e.g. a taxiing lever 50 for generating a taxiing order, e.g. an order specifying a taxiing speed for the aircraft on the ground. Nevertheless, in order to avoid changing the habits of pilots, this control could also be constituted by the throttle control lever. A taxiing computer 51 of the aircraft then verifies whether its engines are in operation, and if not, the computer then understands that the pilot operating the throttle lever desires to move the aircraft by using its taxiing motors.

In response to the taxiing order, the taxiing computer 51 begins by powering the main taxiing motors 3 located in the wheels of the nose landing gear 1. In many circumstances, particularly when the aircraft is heavy and in particular is nose-heavy, the driving force generated by the main taxiing motors suffices to start the aircraft.

Nevertheless, it can happen that the driving force developed by the main taxiing motors is not sufficient to start the aircraft. It is known that resistance to movement is greater when the aircraft is stationary than when it is already moving. If the aircraft is tail-heavy, or standing on a slippery or sloping zone of an airport, then starting the aircraft using only the main taxiing motors runs the risk of being different, or even impossible.

Under such conditions, the taxiing computer 51 causes the auxiliary taxiing motors 7 located in the main landing gear 5 to be powered in parallel, delivering sufficient power to them to enable the aircraft to start.

After starting, rolling resistance drops. The taxiing computer 51 is programmed to adapt the power consumed by the taxiing motors to the minimum strictly necessary for complying with the taxiing order, so as to avoid any pointless excess consumption. The taxiing motors are used when the engines are off, so the energy needed for moving the aircraft comes either from its batteries, or else from an electricity generator driven by the auxiliary power unit of the aircraft. Under such circumstances, it is appropriate to avoid excessive demand on either of those power sources.

The taxiing computer 51 is preferably programmed firstly to reduce the power delivered to the auxiliary taxiing motors 7. Depending on circumstances, it may happen that the driving force generated by the main taxiing motors 3 suffices to move the aircraft at the required speed, so that it suffices not only to reduce the power delivered to the auxiliary taxiing motors 7, but to reduce it to a value such that the resistance offered by the wheel to running is low or zero. In this respect, it is preferable to reduce the power so that the torque generated by the associated wheel is substantially zero. The taxiing computer 51 then adjusts the power delivered to the main taxiing motors 3 on their own.

The provisions of the invention present numerous advantages:

the main taxiing motors are preferably dimensioned to handle ordinary running conditions and they are therefore used for all taxiing operations. The auxiliary taxiing motors are used only for starting the aircraft, or for assisting the main taxiing motors during certain difficult stages (e.g. a taxiway that is slippery or sloping);

the auxiliary taxiing motors in this example are four in number, thereby enabling the driving force that is additional to the driving force generated by the nosewheels to be shared amongst the main wheels. Thus, each auxiliary taxiing motor is of limited power, thereby enabling it to be of reasonable dimensions and thus enabling it to be housed at least in part in a main landing gear wheel within which the internal volume is occupied to a large extent by the associated brake;

the taxiing device of the invention presents a high level of availability, since it is allowable for the aircraft to take off even if one of its auxiliary taxiing motors has failed. Specifically, the loss of an auxiliary taxiing motor represents a loss of 25% of the auxiliary driving force, which can be compensated in part by increasing the torque delivered by the other auxiliary taxiing motors. At worst, it is even possible to allow the aircraft to take off with the device inactivated, since the aircraft can continue to be taxied under drive from its engine;

it is possible to use the taxiing motors to recover a fraction of the braking energy;

it is also possible to use the auxiliary taxiing motors to provide a momentary boost to acceleration if the pilot orders a high level of acceleration;

the auxiliary taxiing motors may also be controlled differentially, thereby making it easier to turn the aircraft, or even enabling it to perform an about-turn on the spot. For this purpose, the taxiing computer 51 receives signals from a steering wheel 52 operated by the pilot to steer the aircraft. The taxiing computer 51 is then advantageously connected to the steering control of the nosewheel 1 so as to steer it, and, where necessary, particularly when performing a tight turn, so as to control the auxiliary taxiing motors 7 differentially so as to assist in turning. The taxiing computer 51 may also control the two main taxiing motors differentially so as to assist the steering control, or even replace it should it fail; and advantageously, the presence of the taxiing motors may be used to enable the aircraft to reverse without requiring assistance from a tractor, and also to set its wheels into rotation immediately prior to landing so that the peripheral tangential speed of each wheel is substantially equal to the speed of the aircraft.

Preferably, the taxiing computer 51 implements anti-spin protection to ensure that none of the wheels driven by a taxiing motor spins when under drive from the motor.

Although in the example shown, the aircraft has two main undercarriages each having two braked wheels, the invention is immediately suitable for being generalized to any aircraft, regardless of the number of main undercarriages and the number of braked wheels they carry.

It is generally advantageous to fit all of the wheels of the main landing gear with auxiliary taxiing motors so as to make the wheel sets more uniform. Nevertheless, under certain circumstances, it is possible to fit only some of the main landing gear wheels with auxiliary taxiing motors. For example, on aircraft such as a B747 having two main wing undercarriages and two main fuselage undercarriages, it may be advantageous to fit auxiliary taxiing motors solely to the wheels of the fuselage undercarriages, assuming that eight wheels fitted with auxiliary taxiing motors suffice. Alternatively, if it is desired to be able to benefit from a differential effect from the auxiliary taxiing motors while turning, it might be preferable to fit them to the wing undercarriage wheels only.

The second implementation of the invention described in detail below is particularly adapted to aircraft having a central main undercarriage with wheels that are not braked, such as the A340, for example.

Figure 5:
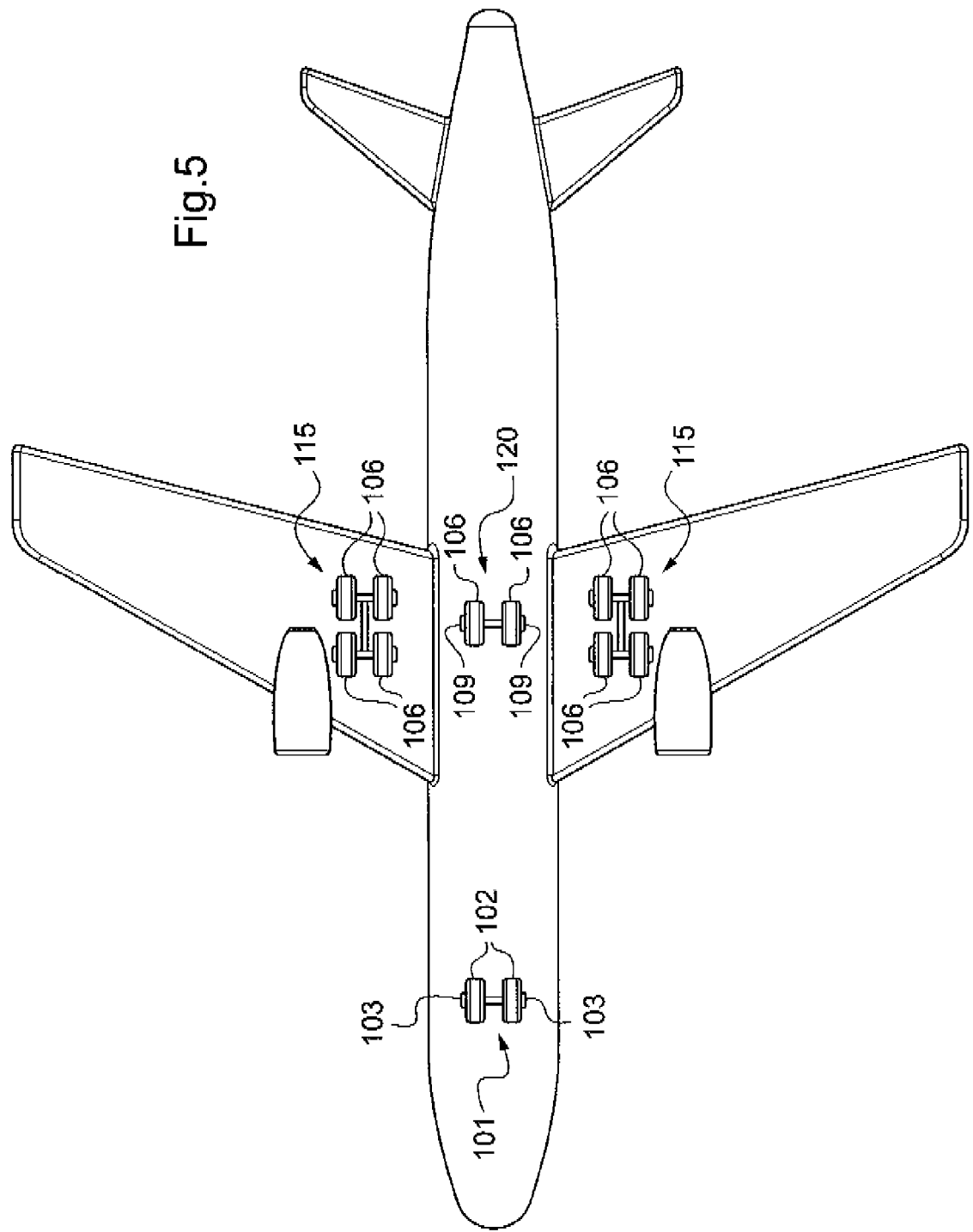
FIG. 5 is a diagrammatic view of an aircraft fitted with a central main undercarriage in another implementation of the invention.

As can be seen in FIG. 5, the aircraft has nose landing gear 101 at the front of the fuselage, two main wing undercarriages 115, each having four braked wheels, and a central main undercarriage 120 carrying two non-braked wheels. According to the invention, the aircraft is fitted with main taxiing motors 103 in the wheels 102 of the nosegear 101, and with auxiliary taxiing motors 109 that are housed in the non-braked wheels 108 carried by the central main undercarriage 120. This makes it possible to take advantage of the empty space in the rims for receiving auxiliary taxiing motors of dimensions greater than those that could be envisaged for an auxiliary taxiing motor housed in a braked wheel. The auxiliary taxiing motors may then be of the same kind as the motors fitted to the wheels of the nose landing gear.

Thus, for heavy versions of existing aircraft, for which it is envisaged providing an additional central main undercarriage, advantage may be taken of the wheels of the additional undercarriage for fitting them with auxiliary taxiing motors, particularly when the corresponding wheels are not braked.

In like manner, on an aircraft such as the A380 in which it has been envisaged providing the main fuselage undercarriages with steerable rear axles and two wheels that are not braked, it is advantageously possible to take advantage of the empty space in the non-braked wheels to provide them with auxiliary taxiing motors.

The invention is not limited to the above description. In particular, although it is stated that on starting use is made of the auxiliary taxiing motors only if the driving force developed by the wheels of the nose landing gear is insufficient to move the aircraft, it is also possible on the contrary to decide that in the context of the invention all of the auxiliary taxiing motors should be powered together with the main taxiing motors, even if the main taxiing motors are capable of moving the aircraft on their own.

Although the description above states that there is one taxiing motor per wheel fitted therewith, reference can be made more generally to a taxiing member that could, where appropriate, itself comprise a plurality of motors.

Although the main taxiing motor member is naturally received inside the rim of the corresponding wheel (and likewise for the auxiliary taxiing motors fitted to non-braked wheels of main undercarriages), it is possible to locate the auxiliary taxiing motor members other than in the wheel rims, if there is no room therein. Various solutions have been proposed for driving main landing gear wheels, for example providing drive via rollers.

Similarly, the auxiliary taxiing motor member may be housed other than in the rim of the associated wheel.

What is claimed is:

1. A method of taxiing an aircraft having at least one nose undercarriage at a front of the aircraft and main undercarriages to the rear of the nose undercarriage, each undercarriage having wheels, at least one of the wheels carried by the nose undercarriage is fitted with a main taxiing motor and at least one of the wheels carried by the main undercarriages is fitted with an auxiliary taxiing motor, the method comprising the steps of:

issuing a taxiing order when the aircraft is stationary;

in response to the taxiing order, powering the main taxiing motor and the auxiliary taxiing motor to cause the aircraft to taxi;

after the aircraft begins to taxi, controlling the auxiliary taxiing motor to reduce the torque delivered by the auxiliary taxiing motor to zero while controlling the main taxiing motor to deliver torque to continue taxiing the aircraft.

2. The method according to claim 1, wherein after the aircraft begins to taxi, each auxiliary taxiing motor is controlled to reduce the torque delivered by the auxiliary taxiing motor member to zero while controlling the main taxiing motor to deliver torque to continue taxiing the aircraft.

3. The method according to claim 1, wherein at least one of the main undercarriage carries wheels that are not braked and that are fitted with auxiliary taxiing motors.

4. The method according to claim 1, wherein the taxiing motors are controlled in a differential manner in order to assist the aircraft in turning.

5. The method according to claim 1, wherein each of the wheels of the nose undercarriage is fitted with a respective main taxiing motor.

6. The method according to claim 1, wherein each of the wheels of the main undercarriages is fitted with a respective auxiliary taxiing motor.

7. The method according to claim 1, wherein the auxiliary taxiing motor is powered when the aircraft is taxied on a taxiway that is sloping or that presents a low coefficient of friction such that the main taxiing motor alone is unable to deliver sufficient torque for taxiing the aircraft.

\* \* \* \* \*